United States Patent
Marks

(10) Patent No.: US 7,138,172 B2
(45) Date of Patent: Nov. 21, 2006

(54) METALLIZABLE WHITE OPAQUE FILMS, METALLIZED FILMS MADE THEREFROM AND LABELS MADE FROM THE METALLIZED FILMS

(75) Inventor: Bruce S. Marks, Glen Mills, PA (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 0 days.

(21) Appl. No.: 09/778,325

(22) Filed: Feb. 7, 2001

(65) Prior Publication Data

US 2001/0036542 A1 Nov. 1, 2001

Related U.S. Application Data

(60) Provisional application No. 60/181,036, filed on Feb. 8, 2000.

(51) Int. Cl.
- *B32B 7/02* (2006.01)
- *B32B 3/06* (2006.01)
- *B32B 3/26* (2006.01)
- *B32B 7/12* (2006.01)
- *B32B 15/04* (2006.01)

(52) U.S. Cl. .............. 428/212; 428/315.9; 428/317.3; 428/318.4; 428/318.6; 428/304.4; 428/343; 428/344; 428/354; 428/307.3; 428/457

(58) Field of Classification Search ............. 428/212, 428/461, 307.3, 318.6, 354, 343, 344, 356, 428/317.3, 315.9, 318.4, 304.4, 457
See application file for complete search history.

(56) References Cited

U.S. PATENT DOCUMENTS

| | | |
|---|---|---|
| 4,701,369 A | 10/1987 | Duncan |
| 4,777,081 A | 10/1988 | Crass et al. |
| 4,883,698 A | 11/1989 | Bothe et al. |
| 4,931,327 A | 6/1990 | Liu et al. |
| 4,965,123 A | 10/1990 | Swan et al. |
| 5,326,625 A | 7/1994 | Schuhmann et al. |
| 5,425,996 A | 6/1995 | Wilkie et al. |
| 5,449,552 A | 9/1995 | Bochow et al. |
| 5,478,643 A | 12/1995 | Peiffer et al. |
| 5,773,136 A * | 6/1998 | Alder et al. ............. 428/317.3 |
| 5,800,913 A * | 9/1998 | Mauer et al. ................. 428/323 |
| 5,811,185 A * | 9/1998 | Schreck et al. ............. 428/349 |
| 5,900,294 A * | 5/1999 | Murschall et al. ....... 156/244.11 |
| 6,013,353 A * | 1/2000 | Touhsaent .................... 428/203 |
| 6,022,612 A * | 2/2000 | Wilkie ........................ 428/215 |
| 6,033,786 A * | 3/2000 | Fatica et al. ................. 428/461 |
| 6,183,856 B1 * | 2/2001 | Amon ...................... 428/318.4 |
| 6,200,740 B1 * | 3/2001 | Aylward et al. ............. 430/536 |
| 6,242,084 B1 * | 6/2001 | Peet ........................ 428/318.6 |
| 6,472,034 B1 * | 10/2002 | Bourdelais et al. ......... 428/35.7 |
| 6,500,533 B1 * | 12/2002 | Kong et al. ............... 428/317.9 |
| 6,514,373 B1 * | 2/2003 | Hill, IV et al. ........... 156/273.3 |
| 6,517,664 B1 | 2/2003 | Dronzek, Jr. |

FOREIGN PATENT DOCUMENTS

| | | |
|---|---|---|
| CA | 2125891 | 12/1994 |
| EP | 199228 | 10/1986 |
| EP | 216343 | 4/1987 |
| EP | 0779325 | 6/1997 |
| EP | 0546741 B | 8/1997 |
| WO | WO 89/02859 | 4/1989 |
| WO | WO 9711846 | 4/1997 |
| WO | WO 99/19412 | 4/1999 |
| WO | WO 02/059860 A2 | 8/2002 |

OTHER PUBLICATIONS

Database WPI Section Ch, Week 198511 Derwent Publications Limited, London GB; AN 1985-065465 XP002170051 & JP 60 02144 A ( Oji Yuka Goseishi KK ) Feb. 2, 1985 (abstract).

ACS Symposium Series, metallization of polymers, polypropylene and aluminum adhesion improvement by N2 low-pressure plasma treatment, American Chemical Society Chapter 31, pp. 431-432, dated Sep. 1989.

* cited by examiner

*Primary Examiner*—Rena Dye
*Assistant Examiner*—Lawrence Ferguson
(74) *Attorney, Agent, or Firm*—Caesar, Rivise, Bernstein, Cohen & Pokotilow, Ltd.

(57) ABSTRACT

A multilayer, metallizable, white opaque film suitable for use in forming metallized plastic labels for bottles and other containers includes at least a internal core layer and opposed outer skin layers. One of the outer skin layers is a non-voided layer having a surface treated to receive a metal layer thereon and the opposed outer skin layer includes an amount of a void creating additive to provide sufficient porosity for the absorption of an aqueous cold glue adhesive of the type employed to adhere a label to a container. Preferably the core layer is free of void creating additives and the opposed outer skin layer for receiving the cold glue adhesive is oxidatively treated, e.g., corona treated, to improve receptivity for the cold glue adhesive.

9 Claims, No Drawings

METALLIZABLE WHITE OPAQUE FILMS, METALLIZED FILMS MADE THEREFROM AND LABELS MADE FROM THE METALLIZED FILMS

RELATED APPLICATION

This utility application is based upon provisional application Ser. No. 60/181,036, filed on Feb. 8, 2000, entitled METALLIZABLE WHITE OPAQUE FILMS, METALLIZED FILMS MADE THEREFROM AND LABELS MADE FROM THE METALLIZED FILMS. Applicant hereby claims the benefits of the filing date of the '036 provisional application for this utility application.

FIELD OF THE INVENTION

This invention relates generally to metallizable white opaque films, and more particularly to metallized films made therefrom and labels made from the metallized films. In particular, this invention is directed to white opaque, metallized films capable of receiving an aqueous cold glue adhesive of the type commonly employed to adhere films to a container; thereby making the metallized films of this invention highly desirable for use in fabricating cut and stack labels to be applied to containers.

BACKGROUND OF THE INVENTION

Metallizable white opaque films are well known in the art, and are made for a variety of applications. For many applications, including but not limited to decorative packaging and certain label applications, it is highly desirable to achieve a brilliant, high gloss appearance from the metal layer. In prior art, opaque, metallized films employing an opacifying, void creating additive in the core in a sufficient quantity to achieve the desired opacity in the film, the metal layer tends to be somewhat dull; not having the high brilliance and gloss characteristics desired for many applications.

One way of achieving a greater brilliance or gloss in the metal layer is to avoid the use of void-creating additives, such as calcium carbonate, to achieve the desired opacity. Thus, for applications requiring a greater brilliance or gloss in the metal layer, opacity and whiteness can be achieved by incorporating $TiO_2$ particles into the core of the film, which are too small to initiate voiding.

In addition, a non-voided metallizable skin composed of polypropylene, copolymers of polypropylene, or blends thereof, can be coextruded on one side of the core layer. Such a skin layer conceivably also could contain $TiO_2$ to further improve the opacity and the whiteness of the film. While the use of non-voiding additives to establish whiteness and opacity in metallized films may provide satisfactory brilliance and gloss in the metal layer, they do not contribute to achieving other desired properties for label applications.

When the metallized film is intended to be used for label applications, and more specifically, for cut and stack label applications, it is highly desirable to employ aqueous cold glue adhesives on the label to adhere the label to the desired container. Several methods exist to permit the use of these cold glue adhesives in label applications. First, in paper labels, the cellulosic structure inherently is able to absorb excess moisture from the cold glue adhesive, thereby allowing adhesion of the paper label to the container. However, for many applications it is highly desirable to employ plastic labels, since they tend to be more durable than paper labels.

Plastic films are employed in the fabrication of labels that include an aqueous cold glue adhesive to adhere the label to a container, e.g., a glass or plastic bottle. For such applications, it is common practice to employ a secondary coating operation in which a hygroscopic coating is applied to a surface of the film, and this coating constitutes the adhesive-receiving layer. While these films are generally satisfactory for their intended purpose, they do require the use of a secondary coating operation, thereby increasing fabrication costs.

Exemplary disclosures of biaxially oriented metallized white film can be found in U.S. Pat. No. 5,425,996 (Wilkie et al.); U.S. Pat. No. 5,326,625 (Schuhmann et al.) and U.S. Pat. No. 4,883,698 (Bothe et al.).

U.S. Pat. No. 4,701,369, issued to Duncan, discloses an oriented multilayer film including a non-absorbent core that is free of voids and one or two surface layers. Each surface layer includes void creating additive to render the surface(s) absorbent to water. Duncan does not relate in any way to metallizable, or metallized films, and clearly does not relate in any way to a film designed to enhance the brilliance or gloss of a metallized film. However, Duncan does disclose a variety of void creating additives that are usable in this invention. The Duncan disclosure is hereby incorporated by reference herein.

In view of the above, there is a need for metallizable white opaque films that are capable of receiving a brilliant, high gloss metal layer thereon and that are well suited for use in label applications, and in particular cut and stack label applications wherein aqueous cold glue adhesives can be used, without the need for including any separate hygroscopic coating step. It is to such metallizable white opaque films, metallized films made therefrom, and labels made from the metallized films that the present invention relates.

DESCRIPTION OF THE BEST MODE OF THE INVENTION

The metallizable white opaque films of this invention include at least three distinct layers that cooperate to provide an opaque, biaxially oriented film capable of receiving a brilliant, high gloss metal layer on one exposed surface thereof, and receiving on its opposed exposed surface an aqueous cold glue adhesive of the type employed on plastic label stock to adhere plastic labels to a desired container, e.g., a plastic or glass container or bottle. The opposed exposed surface is the outer surface of a porous layer that aids in imparting the desired opacity to the film and also has the desired absorption characteristics to absorb the required amount of moisture from the aqueous cold glue adhesives to be applied thereto.

The films in accordance with this invention preferably are biaxially oriented films made on conventional tenter and/or bubble processing equipment. In accordance with the tenter process, the multiple layers of the film are extruded through a conventional die, and then are sequentially stretched in the machine direction, approximately 4 to 7% and then in the transverse direction, approximately 7 to 11% prior to cooling the film into its desired biaxially oriented state. The particular process employed to manufacture the films of this invention is not considered a limitation on the invention; it being understood that any acceptable process for forming the biaxially oriented films of this invention can be employed.

In one preferred embodiment of this invention, the film is a three layer structure including an internal core and opposed skin layers. The internal core preferably is a polypropylene homopolymer or a mini-random copolymer having a low-ethylene content on the order of 1% or less. In the most preferred embodiments of this invention void creating additives are completely omitted from the core. It has been determined that the inclusion of as little as 1–2% calcium carbonate void-creating additive in the core adversely affects the final metal brilliance of the metallized film. In fact, the metal brilliance of such lightly voided films is reduced by as much as a factor of 5 at a reflectance angle of 20°, as measured using a Byk Gardner mirror-TRI-gloss meter. However, it is within the scope of this invention to include non-void creating additives, such as titanium dioxide in the core to enhance opacity. In a representative embodiment of this invention the core has a thickness of approximately 200 gauge.

The skin layer that is intended to receive a thin metallized coating thereon preferably is a copolymer or a mixture of copolymers of polypropylene that is treated in a well known manner to improve surface adhesion so that the layer will be receptive to receiving the thin metallized layer thereon. The most preferred treatment in this invention is a corona treatment process. In an exemplary embodiment of this invention the skin layer intended to receive the metallized coating has a thickness of approximately 20 gauge or less.

It should be noted that flame treatment of thick films and voided opaque films is an extremely difficult and impractical treatment process. In particular, voided opaque films are not very good at dissipating the heat generated by a flame treatment process, and for this reason, other treatment processes such as corona treatment are preferred.

The opposed, or back skin layer, which preferably is on the order of 15–25 gauge in thickness, is composed of polypropylene homopolymers, copolymers of polypropylene including comonomers of $C_{10}$ or less in an amount less than 50% by weight of the copolymer, and blends of said polypropylene homopolymers and polypropylene copolymers. In the most preferred embodiment of the invention the opposed, or back skin layer is either a polypropylene homopolymer or a mini-random copolymer of the same composition employed in the core. However, unlike other prior art films, this back skin layer is heavily voided with a suitable void creating additive to provide a desired level of porosity for absorption of moisture from aqueous cold glue adhesives of the type employed to adhere a label to a container. In the most preferred embodiment of the invention the heavily voided skin layer is surface treated by corona treatment or other oxidative treatment process adaptable to the treatment of a voided polymer layer, to thereby improve the wetting and adhesion of the cold glue adhesive to the skin layer of the film. This is a very important requirement of commercially available films in accordance with this invention.

In the preferred embodiments of this invention the voiding agent employed in the back skin layer is calcium carbonate in the 1 to 5 micron particle size range. Most preferably the calcium carbonate employed in this invention is of a 1 to 2 micron particle size and is present in an amount of about 20% to about 60% by weight of the skin layer to achieve the desired porosity. Other void creating opacifying agents that may be useable in this invention are silicon dioxide, aluminum silicate and magnesium silicate.

It is believed that percentages of 1 to 2 micron calcium carbonate below 20% by weight of the skin layer will not provide the necessary porosity to absorb the required moisture levels from the aqueous cold glue adhesives employed in label applications. On the other hand, it is believed that quantities of 1 to 2 micron calcium carbonate in excess of 60% by weight of the skin layer will adversely affect the processability of the skin layer. In particular, such high quantities of calcium carbonate will not be effectively and uniformly disbursed throughout the skin layer; thereby adversely affecting the uniformity of the Theological properties of the film.

In more preferred embodiments of this invention the quantity of 1 to 2 micron calcium carbonate should be at least 25%, more preferably at least 35%, and even more preferably at least 40%. Most preferably, the upper quantity limit of the 1 to 2 micron calcium carbonate should be 55% or less and even more preferably no more than 50%. All percentages of calcium carbonate referred to herein are by weight, based on the total weight of the voided skin layer including the calcium carbonate therein.

In accordance with this invention, the high voiding of the back skin layer that is opposed to the metallized skin layer provides the dual benefit of enhancing the opacity of the film and providing the desired porosity for the absorption of moisture from aqueous cold glue adhesive of the type employed in label applications. These dual benefits are achieved without undesirably affecting the brilliance of the metallized films within the scope of this invention.

In the most preferred embodiments of this invention, the non-voided corona treated skin layer has a thin metallized layer, on the order of angstroms, applied to it by a vapor deposition process or other well known metallizing process.

The metallized film can then be cut into desired labels, and in particular, cut and stack labels of the type employed in a continuous processing operation in which water-based glues or adhesives are applied to the back skin layer prior to adhering the layer to a desired container, e.g., a plastic bottle, glass bottle or the like. Preferred water-based adhesives usable in this invention include Henkel Optal 10-7300 and Henkel Optal 10-7302. Both of these latter adhesives include essentially the same chemistry, with the 10-7302 being formulated for easier clean-up.

Other conventional additives, in conventional amounts, may be included in the compositions and films of the invention. Suitable other conventional additives include antioxidants, pigments, orientation stress modifiers, flame retardants, antistatic agents, antiblocking agents, antifoggants and slip agents.

Another class of additives that may be included in the compositions of the invention are low molecular weight hydrocarbon resins( frequently referred to as "hard resins".)

The term "low molecular weight hydrocarbon resins" refers to a group of hydrogenated or unhydrogenated resins derived from olefin monomers, such as the resins derived from terpene monomers, coal tarfractions and petroleum feedstock. Suitable such resins prepared from terpene monomers (e.g., limonene, alpha and beta pinene) are Piccolyte resins from Hercules Incorporated, Wilmington, Del., and Zonatac resins from Arizona Chemical Company, Panama City, Fla. Other low molecular weight resins are prepared from hydrocarbon monomers, as $C_5$ monomers (e.g., piperylene, cyclopentene, cyclopentadiene, and isoprene), and mixtures thereof. These are exemplified by the hydrogenated thermally oligomerized cyclopentadiene and di cyclopentadiene resins sold under the trade name Escorez (for example Escorez 5300) by Exxon Chemical Co. of Baytown, Tex. Others are prepared from $C_9$, monomers, particularly the monomers derived from $C_9$ petroleum fractions which are mixtures of aromatics, including styrene, methyl styrene, alpha methyl styrene, vinyl naphthalene, the indenes and methyl indenes and, additionally, pure aromatic monomers, including styrene, α-methyl-styrene and vinyltoluene. Examples of these resins include hydrogenated α-methyl styrene—vinyl toluene resins sold under the trade name Regalrez by Hercules Incorporated of Wilmington, Del.

In general, the low molecular weight resins that can be included in the compositions of this invention are characterized by a molecular weight less than about 5000, a $T_g$ of about 50 to 100° C. and a softening point less than about 140° C.

Films prepared with a composition according to this invention that include a minor amount of a low molecular weight resin may have a lower MVTR than is realized with the blends discussed above. It is believed that the low molecular weight resin can be included in the compositions at a concentration up to about 30% by weight, preferably up to about 4 to 20% and most preferably about 4 to 10% by weight based on the total weight of the composition.

EXAMPLE

In an exemplary embodiment of this invention, a three layer film includes a 20 gauge, non-voided metal bonding layer, a 190 gauge non-voided core and a 20 gauge voided back skin layer. The metal bonding layer included a blend of 35% Union Carbide SRD4-189 (an 8% butene-propylene copolymer), 15% Union Carbide SRD4-190 (a 12.5% butene-propylene copolymer) and 50% Fina 8753 (an ethylene-propylene copolymer including 3.41% ethylene therein). The non-voided core included 95% Epsilon E-1803 (an ethylene-propylene mini-random copolymer including 0.6% ethylene) and 5% titanium dioxide ($TiO_2$). The voided back skin layer included 65% Epsilon E-1803 (a propylene/ethylene mini-random copolymer including 0.6% ethylene), 25% of one micron FilmLink 400 (a calcium carbonate having a nominal mean particle size of one micron) and 10% titanium dioxide ($TiO_2$).

The above film had substantially the following properties;
Thickness 230 gauge
Yield 13,300 in²/lb.
Density 0.926 g/cm³
TAPPI Opacity 82%
Whiteness Index 89

When metallized to an Optical Density of 2, the above identified film possessed a highly brilliant metal appearance on the metallized side and a uniform, white appearance on the opposite side.

Optical Density (O.D.)=$\log_{10}$ (1/T) where T is transmittance, which has no units. Transmittance is the ratio of transmitted power (light at a given wave length) to incident power (light). An Optical Density of 2.0 translates to T=0.01, or 1% of the incident light being transmitted through the film.

The thickness of the film was determined in accordance with ASTM No. D374.

The yield was identified in accordance with ASTM No. D4321.

The density of the film was determined in accordance with ASTM No. D792.

The TAPPI Opacity was determined in accordance with ASTM No. D589.

The Whiteness Index was determined in accordance with ASTM No. E313.

The film of this Example was tested with the Henkel 10-7300 cold glue adhesive on a Krones labeler. Although the adhesive did adhere the label to a bottle, the film still exhibited slide on the bottle after 1 hour, and no slide with picture-frame (label perimeter about ⅛ to ¼ inch in from the marginal edges of the label) fiber tear indicating adhesion after 20 hours. In other words, after 20 hours the marginal edges of the label were not able to be easily removed, or separated from the bottle without tearing.

Applicant has determined that by employing in the voided skin layer receiving the cold glue adhesive, 35% and 55%, respectively, of 2 micron calcium carbonate by weight of such voided skin layer, the film labels exhibited no slide and picture-frame fiber tear only one hour after being applied to a bottle. Applicant believes this same beneficial result of employing high loadings of calcium carbonate will be achieved with 1 micron calcium carbonate and also possibly with larger size calcium carbonate.

Without further elaboration, the foregoing will so fully illustrate my invention that others may, by applying current or future knowledge, readily adopt the same for use under various conditions of service.

What I claim as the invention is the following:

1. A multilayer, metallized white opaque, plastic label including at least an internal core layer and opposed outer skin layers thinner than said core layer, one of said outer skin layers being a non-voided layer having an outer surface thereof oxidatively treated to receive a metal layer thereon, the opposed outer skin layer including at least 25% to about 50% by weight, based upon the weight of said opposed outer skin layer, of a void creating additive, an aqueous cold glue adhesive of the type employed to adhere the label to a container on said opposed outer skin layer and a metal layer on the outer surface of said one of said outer skin layers.

2. The label of claim 1, wherein said void creating additive is calcium carbonate.

3. The label of claim 1, wherein said internal core layer is free of void creating additives.

4. The label of claim 1, wherein the outer skin layer including a metal layer thereon has a thickness of approximately 20 gauge or less; said core layer has a thickness of approximately 200 gauge and said opposed outer skin layer has a thickness of about 15–25 gauge.

5. The label of claim 1, including a biaxially oriented polyolefin film.

6. A white opaque plastic label including a first and second outer layer and a core layer between said outer layers, said outer layers being thinner than said core layer, said first outer layer including at least 25% to about 50% by weight, based on the weight of said first outer layer, of a void creating additive therein and an aqueous cold glue adhesive on an outer surface of said first outer layer for securing said label to a container, said second outer layer being free of a void creating additive and including a metal layer on an outer, exposed surface thereof.

7. The label of claim 6, wherein said core layer is adhered to said first and second outer layers.

8. The label of claim 6, wherein said void creating additive is calcium carbonate.

9. The label of claim 6, wherein said core layer is free of a void-creating additive.

* * * * *